Patented Feb. 4, 1936

2,029,322

UNITED STATES PATENT OFFICE 2,029,322

SYNTHETIC TANNING MATERIAL

Alphons O. Jaeger, Greentree, Pa., assignor, by mesne assignments, to American Cyanamid & Chemical Corporation, New York, N. Y., a corporation of Delaware No Drawing. Application March 12, 1934, Serial No. 715,164

22 Claims. (Cl. 149—5)

This invention relates to synthetic tanning agents and methods of preparing the same.

In the past various synthetic tanning agents or tanning aids have been proposed. One of the most successful classes of synthetic tanning agents is that of the sulfonated diarylmethanes and their derivatives. These tanning agents are normally prepared by sulfonating various aromatic compounds, such as for example naphthalene, various phenols and the like, and condensing with aldehydes such as formaldehyde. There is some controversy with regard to whether some of these tanning agents are simple compound or polymers and in the present application they will be discussed as simple compounds, it being understood that where it is not definitely known whether they may be more or less polymerized, the simple formulas are intended also to include polymers.

The disulfodinaphthylmethane tans as well as the disulfodioxydiphenylmethanes have achieved considerable commercial prominence. As ordinarily prepared, however, they are open to a serious defect in that the products tend to be rather dark colored, ranging from brown to black, and as a result their use has been somewhat restricted in light colored and especially white leathers, a field in which synthetic tanning agents, particularly when used in conjunction with other tans and as after tans, are particularly useful. The difficulty of producing a light color tan has caused producers in the past to adopt various expensive methods to overcome this disadvantage. Thus, for example, in connection with the disulfodinaphthylmethane tans especially purified naphthalene betasulfonic acids have been used with the object of reducing the amount of colored compounds present. Such pure betasulfonic acids are, of course, considerably more expensive than crude naphthalene sulfonic acids and their salts which can be obtained very cheaply.

According to the present invention sulfonated diarylmethane tans are produced without the use of especially purified raw materials and without additional purification steps and yet the tans thus produced show an increased effectiveness and better color than those produced by the prior art even from purer raw materials. The present invention depends in its broadest feature on the presence of adsorbents for colors, such as, for example, activated carbon of various types, during the reactions in the formation of the tan itself and particularly during the step of condensing with formaldehyde. The presence of the adsorbent during the reaction itself appears to adsorb colored impurities in statu nascendi with remarkable effectiveness and removes them to an extent which is not possible by treatment of the finished tan with adsorbents for, of course, this would be ordinarily the preferred procedure. It is not definitely ascertained as yet just why the presence of an adsorbent during the reactions will remove color when the same adsorbent will not be satisfactory when applied to the final tan. It is possible that impurities formed in an acid condition are more readily absorbed or it is possible that the final tan acts as a protective colloid and prevents adsorption of colored impurities or retards adsorption. In any event regardless of what factor or which factors are primarily responsible for the greatly increased adsorptive action of the adsorbents during reaction, the product obtained according to the present invention when compared with the corresponding synthetic tans of the prior art shows a remarkably decreased color and when employed in tanning light colored leathers much better and lighter shades and especially beautiful white shades are obtained.

While the present invention includes the production of any synthetic tans of the sulfonated diarylmethane type by means of adsorbents in the reaction mixture, in more specific aspects the invention also includes other features. One important feature is the addition of soluble carbohydrates, such as various sugars, to increase the penetration and solubilizing action of the tan. The use of soluble carbohydrates with synthetic tans generally is not claimed in the present application, but forms the subject matter of my copending application Serial No. 715,163, filed March 12, 1934. In the present application the addition of solubilizing carbohydrates is claimed only in combination with the use of adsorbents in the production of the tan itself.

Another feature which is desirable consists in the removal of small amounts of iron which frequently contaminate the product especially when crude sulfonated products are employed. The removal of iron is always desirable and becomes particularly important when the synthetic tan is used with natural tans which form colored compounds with iron. The iron removal which will be described in connection with the specific examples below may be effected by any suitable reagents, such as sodium sulfide, various ferrocyanides and the like.

When used the tanning agent of the present invention is ordinarily employed as a solution or dispersion and normally it is important to adjust the hydrogen ion concentration to the desired figure for the particular type of tanning in which the synthetic tan is to be employed. While the present invention is not broadly restricted to the use of any particular acid for producing the final desired acidity, I prefer to employ organic acids which are mild and do not injure the leather. Thus, for example, formic acid is very suitable, and where it is cheaply available maleic or fumaric acid is likewise very effective. Maleic acid likewise has the advantage that it tends to destroy or inhibit the growth of organisms which might tend to contaminate the product on standing. Other suitable acids are lactic, malic, acetic, mesotartaric, phthalic, succinic, benzoic, etc. Some of these acids are not highly soluble, their use depends on the concentration of acid required. Sulfonated acids such as sulfosuccinic, sulfobenzoic, and sulfophthalic acids may also be used and their greater strength permits the use of smaller quantities.

The use of an adsorbent in the reaction produces very desirable light color products and for many purposes these products are entirely satisfactory, but it is sometimes desirable to even more fully remove colored impurities and this may be effected by aerating the product after condensation with formaldehyde. This is a desirable procedure where products of the highest quality are required and is included in the present invention in its more specific aspects.

For certain types of leather a soft feel and a very full leather is desirable. I have found that for some purposes special tanning preparations may utilize fermented skimmed milk products, the lactic acid is a suitable acidifying acid and the protein material acts as a filling agent for the leather, which results in improved products for certain purposes. A somewhat similar effect is obtained by utilizing the water from cooking of fish or similar products which contains considerable amounts of proteins. In this case, of course, additional acid must be added in order to produce the desired degree of acidity for the particular tanning operation.

It is customary to market synthetic tans of the disulfodiarylmethane type in the form of solutions which may contain from 50 to 60% of water or even more. This presents a certain economic disadvantage as it requires rather expensive containers, such as oak barrels or specially treated drums, and where it is necessary to ship the tan long distances, of course the freight is considerably increased because approximately half of the weight of the product is water. It is therefore, desirable where shipping and container costs are a very serious item to eliminate the water. This had usually been considered impossible in the prior art, but I have found that with the improved process of the present invention it is possible to produce a solid product containing a sufficient amount of solid acid so that it can be dissolved and used by the tanner with good success. Various solid acids can be employed, but I have found that sodium or potassium bisulfate or maleic or succinic acid are, in general, preferable. In some the tan itself can consist of a mixture of free tan acid and its alkali metal or ammonium salts. Solid tan produced according to the present invention, of course, possesses the same advantages of light color and especially when a sufficient quantity of soluble carbohydrate is present the solid tanning material can be easily dissolved. The present invention, therefore, includes solid as well as liquid products.

The invention will be described in detail in the following specific examples which represent very desirable operating procedures which have been proven successful in the manufacture of high grade products, but it should be understood that the details of procedure in the specific examples are not intended to limit the invention and variations from the specific procedures set out are included. It is an advantage of the present invention that comparatively crude raw materials may be used. However, the naphthalene which is employed in producing the dinaphthylmethane tans may be advantageously of reasonable purity for the purer the naphthalene the lighter the product. Various grades of naphthalene may, therefore, be used and are included, it being understood, of course, that where products of maximum lightness are desired reasonably pure naphthalene should be used.

*Example I*

108 lbs. of semi-refined naphthalene are charged into a sulfonating kettle provided with a suitable heating jacket. The jacket temperature is maintained at about 185–190° C. and the charge is agitated until the temperature reaches 165° C. In the meantime 172 lbs. of 66° Bé. sulfuric acid are preheated to 80° C. The preheated sulfuric acid is then caused to flow into the molten naphthalene at a rate which takes 15 minutes to introduce the whole amount of acid. At the start the temperature of the naphthalene drops slightly and then rises. It is maintained between 160 and 165° C. during the entire sulfonation period. After all of the acid has been added the heating is continued for five minutes.

45 lbs. of water are introduced into another kettle and the sulfonation melt is blown into this latter kettle which is jacketed and is cooled so that the diluted sulfonation melt is cooled down to 85° C. 2.1 lbs. of activated charcoal which may, for example, be of the grade sold as "Nuchar" is added to the diluted sulfonation melt. The condensation kettle is provided with a reflux condenser which is turned on and the mixture is then heated by means of steam to a temperature of 80° C. whereupon 11½ lbs. of a technical 40% formaldehyde solution is slowly added during about 2 hours, then the addition of formaldehyde is continued, a further 23 lbs. being added over a period of about 10 hours. After the last of the formaldehyde is added the mixture is maintained with agitation at 85 to 90° C. for an additional 8 hours or until the condensation is complete which may be determined by testing for excess formaldehyde and for solubility. A formaldehyde test is made on 2 cc. of the mixture to which is added 50 cc. of normal sodium hydroxide and 25 cc. of tenth normal iodine solution. The iodine excess is then titrated and when a test shows not over 10 cc. of tenth normal iodine consumed, the condensation is complete provided 10 cc. of the melt can be dissolved in 50 cc. of cold distilled water to form a clear solution.

After the condensation water is charged into a neutralizing vat and the condensation mixture blown into it, thereupon ammonia in the form of technical aqua ammonia of 26° Bé. is added until a slight alkalinity to litmus is achieved. The amount of ammonia normally required is about 182 lbs. After the ammonia has been added air is blown through the mixture for ten minutes until the temperature falls to about 70° C. Thereupon 1½ lbs. of technical 60% sodium sulfide chips are dissolved in a quart of water and added to the neutralized liquid. Tests can then be made for iron and for excess sodium sulfide. The iron test may be made with ammonium sulfide which shows dark coloration if iron is still present and excess sodium sulfide may be tested with lead acetate. If iron is still present additional sodium sulfide should be added until a slight excess is shown. Excess sodium sulfide may be removed by careful treatment with precipitated ferric hydroxide. 6.7 lbs. of a filtering kieselguhr, for example such as is sold under the name "Filterscel", is added and the solution is then pumped through a filter press. The filter is washed with about 2½ gallons of distilled water. Instead of distilled water any other water which is practically free from iron may be employed. The solution is then adjusted to final formula by mixing 59 parts of 66° Bé. sulfuric acid with 11 gallons of distilled water in an air-lift. The diluted acid is added until a 10 cc. test sample requires 4 cc. of normal sodium hydroxide for titration to neutrality to methyl red. Thereupon formic acid is added until 8 cc. of normal sodium hydroxide is required to neutralize a 10 cc. sample of the solution, the amount of formic acid required normally is about 15 pounds. 50 lbs. of sugar and 40 lbs. of salt are also stirred into the solution and it is diluted with distilled water to make up a total water addition of 50 gallons. Approximately 1000 lbs. of product is obtained. The solution is then allowed to settle in a vat for some five days and is clarified by a clarification filter. It is then ready for use and is a much lighter color and better penetration than disulfodinaphthylmethane tans made in the ordinary way.

The above example is, of course, intended to be typical and when batches of different sizes are made up a number of the factors will vary, such as the time for sulfonation, condensation, etc. Wide diversion from the exact procedure is also possible and the present invention is in no sense limited to exact figures on process steps.

*Example II*

Phenol is sulfonated in the usual manner to form the monosulfophenol. This is then condensed with formaldehyde under substantially the same conditions as described in Example I, the amount of formaldehyde being 1 mol. of $CH_2O$ for 2 mols. of phenolsulfonic acid. Condensation takes place in the presence of activated carbon, as described in Example I, and iron removal is effected in a similar manner. The acidification of the final product may be with formic, maleic or other suitable organic acids and the proportions of sugar and salt added should be approximately the same as in Example I. A product is obtained which is lighter in color and gives better results than dioxydisulfodiphenylmethane tans prepared in the usual way.

In Example I the naphthalene is sulfonated to produce a mixture of alpha and beta sulfonic acid in which the betasulfonic acid predominates. This process is for many purposes the best one, but it is not necessary to start out with such a mixture of naphthalene sulfonic acids. On the contrary sometimes it is desirable to utilize sodium naphthalene sulfonates as raw materials when these are available as by-products or main products in the production of betanaphthalene. These naphthalene sulfonates must, of course, be acidified with sulfuric acid which results in the production of sodium sulfate. Sodium sulfate is a suitable salt to be present in the final product and in such a case it may replace partly or wholly any additional sodium chloride. Similarly other salts may be used as the product operates satisfactorily with a large number of soluble salts, in fact practically any soluble salt which does not have a deleterious effect on the leather or other ingredients in the tanning process, since the salt acts practically entirely by reason of its osmotic pressure. When starting out with naphthalene, sodium chloride is used because it is the cheapest available salt and gives very satisfactory results.

*Example III*

The crude condensation melt prepared as described in Example I is treated with sodium hydroxide chips until the liquor is neutral to litmus. The hot solution is then immediately poured on an aluminum pan and evaporated to dryness by careful heating. The product is of a light grayish appearance, dissolves well in warm water, giving a light straw-colored solution.

Sugar or other carbohydrate may be added. The ammonium salt may be prepared in a similar manner by neutralizing with ammonia and is even more soluble than the sodium salt. In using solid syntans they may be dissolved and the correct amount of acid added, but many tanners do not wish to go to the trouble of checking the acidity carefully and it is, therefore, desirable to incorporate with the solid material sufficient solid acid or acid material to give the correct acidity when dissolved in water. Various solid acids may be used, but I prefer to use sodium acid sulfate or maleic acid.

If desired, mixtures of maleic acid and sodium acid sulfate may also be employed and give good results. The amount added should be such so that when the whole material is dissolved an acidity corresponding to the best pH for the particular tanning is obtained. In many cases a pH of 1.6 to 1.0 is desirable.

The dry syntan when used in competition with the liquid product and with the commercial disulfodinaphthylmethane tan sold under various trade names shows that the best results are obtained with the liquid syntan of the present invention and the solid gives almost as perfect results. The differences between the solid and the liquid are so slight as to be practically of no consequence and where the savings in freight by shipping a solid material constitute an important factor in the cost of the material, the solid syntan described above is economically preferable to the liquid.

What I claim is:

1. A synthetic tanning agent of the sulfonated diarylmethane type in the production of which at least one reaction step has been carried out in the presence of a decolorizing absorbent, the synthetic tanning agent being characterized by a light color and by the property of producing lighter shades of leather when employed as a tanning agent or bleaching agent.

2. A synthetic tanning agent of the disulfodinaphthylmethane type in the production of which at least one reaction step has been carried out in the presence of a decolorizing absorbent, the synthetic tanning agent being characterized by a light color and by the property of producing lighter shades of leather when employed as a tanning agent or bleaching agent.

3. A process of producing a synthetic tanning agent of the sulfonated diarylmethane type in which at least one of the reaction steps is carried out in the presence of a decolorizing absorbent.

4. A process of producing a synthetic tanning agent of the disulfodinaphthylmethane type in which at least one of the reaction steps is carried out in the presence of a decolorizing absorbent.

5. A method of producing a synthetic tanning agent of the sulfonated diarylmethane type which comprises sulfonating an aromatic compound and condensing the sulfonated compound thus produced with formaldehyde in the presence of a decolorizing absorbent.

6. A method of producing a disulfodinaphthylmethane tan which comprises sulfonating naphthalene and condensing the product with formaldehyde in the presence of a decolorizing absorbent.

7. A method according to claim 3 in which the decolorizing absorbent is an activated carbon.

8. A method according to claim 4 in which the decolorizing absorbent is an activated carbon.

9. A method according to claim 5 in which the decolorizing absorbent is an activated carbon.

10. A method according to claim 6 in which the decolorizing absorbent is an activated carbon.

11. A method according to claim 4 in which the crude tanning agent is subjected to the action of reagents precipitating iron compounds and is separated from the compounds so precipitated.

12. A method according to claim 3 in which the crude synthetic tan in the form of an aqueous solution is subjected to the action of iron precipitating reagents in the presence of air blown through the solution.

13. A method according to claim 4 in which the crude synthetic tan in the form of an aqueous solution is neutralized with ammonia, aerated and treated with sufficient sodium sulfide to precipitate its iron content.

14. A synthetic tan according to claim 1 containing physically admixed therewith a soluble carbohydrate.

15. A synthetic tan according to claim 2 containing phsically admixed therewith a soluble carbohydrate.

16. A synthetic tan according to claim 2 in the form of a ready prepared aqueous solution containing a sufficient amount of organic acid selected from the group maleic acid and formic acid, to produce a hydrogen ion concentration suitable for tanning.

17. A solid synthetic tan according to claim 1 consisting of a soluble salt of the sulfonated tan admixed with sufficient solid acid substance to produce on solution the required hydrogen ion concentration for leather tanning.

18. A solid synthetic tan according to claim 2 consisting of a soluble salt of the sulfonated tan admixed with sufficient solid acid substance to produce on solution the required hydrogen ion concentration for leather tanning.

19. A solid synthetic tan according to claim 2 consisting of a soluble salt of the sulfonated tan admixed with sufficient solid acid substance selected from the group consisting of acid alkali metal salts of strong mineral acids and dibasic organic carboxylic acids to produce on solution the required hydrogen ion concentration for leather tanning.

20. A solid synthetic tan according to claim 2 consisting of a soluble salt of the sulfonated tan admixed with sufficient soluble carbohydrate and a solid acid substance selected from the group consisting of acid alkali metal salts of strong mineral acids and dibasic organic carboxylic acids to produce on solution the required hydrogen ion concentration for leather tanning.

21. A soluble non-resinous synthetic tanning agent of the sulphonated diarylmethane type substantially free from adsorbable colored impurities and substantially free from oxidation products, the tanning agent characterized by a light color and by the property of producing lighter shades of leather when employed as a tanning agent or bleaching agent.

22. A soluble non-resinous synthetic tanning agent of the sulphonated dinaphthylmethane type substantially free from adsorbable colored impurities and substantially free from oxidation products, the tanning agents characterized by a light color and by the property of producing lighter shades of leather when employed as a tanning agent or bleaching agent.

ALPHONS O. JAEGER.